(12) United States Patent
Kagohara et al.

(10) Patent No.: US 6,413,654 B1
(45) Date of Patent: Jul. 2, 2002

(54) MULTI-LAYERED PLAIN BEARING AND PRODUCING METHOD THEREOF

(75) Inventors: Yukihiko Kagohara; Masahito Fujita; Koichi Yamamoto; Takayuki Shibayama, all of Nagoya (JP)

(73) Assignee: Daido Metal Company Ltd., Nagoya (JP)

(*) Notice: Subject to any disclaimer, the term of this patent is extended or adjusted under 35 U.S.C. 154(b) by 0 days.

(21) Appl. No.: 09/977,542

(22) Filed: Oct. 16, 2001

(30) Foreign Application Priority Data

Oct. 18, 2000 (JP) .......................... 2000-317841

(51) Int. Cl.[7] .......................... B32B 15/20; F16C 33/00
(52) U.S. Cl. .................. 428/653; 148/516; 148/531; 148/535; 148/698; 384/912; 428/654; 428/940
(58) Field of Search .................. 428/653, 654, 428/940; 384/912; 148/516, 531, 535, 698

(56) References Cited

FOREIGN PATENT DOCUMENTS

| GB | 2 175 604 A | 12/1986 | | |
|---|---|---|---|---|
| GB | 2 239 059 A | 6/1991 | | |
| GB | 2 260 338 A | 4/1993 | | |
| GB | 2 266 564 A | 11/1993 | | |
| GB | 2 310 465 A | 8/1997 | | |
| JP | 55-122850 A | * | 9/1980 | ................. 428/653 |
| JP | 61-272358 | | 11/1987 | |

* cited by examiner

Primary Examiner—Robert R. Koehler
(74) Attorney, Agent, or Firm—Browdy and Neimark

(57) ABSTRACT

Disclosed is a multi-layered plain bearing which comprises a steel back, an intermediate layer made of an aluminum alloy and an aluminum-base bearing alloy layer comprising one or more elements selected from the group consisting of Cu, Zn, Mg and Si. The aluminum-base bearing alloy layer is bonded to the steel back via the intermediate layer and subsequently subjected to a solid solution treatment at a temperature of not lower than 400° C. The adjacent region of the intermediate layer to the steel back consists of, by mass, 2% to 8% of Si, and the balance of Al and incidental impurities.

8 Claims, 1 Drawing Sheet

MULTI-LAYERED PLAIN BEARING AND PRODUCING METHOD THEREOF

BACKGROUND OF THE INVENTION

1. Field of the Invention

The present invention relates to a multi-layered plain bearing which comprises a steel back and an aluminum-base bearing alloy layer which is bonded to the steel back via an intermediate layer made of an aluminum alloy, and to a producing method thereof.

2. Brief Description of the Art

Aluminum alloy plain bearings have excellent properties of conformability and wear resistance, and have been broadly used for high power engines of motor vehicles and general industrial machines. In general, the aluminum alloy plain bearings have a three-layer structure in which an aluminum bearing alloy layer is bonded to a steel back via an intermediate layer.

The intermediate layer has been conventionally made of a comparatively soft material of pure aluminum or an aluminum alloy. However, coping with the recent trend of high power engines, aluminum bearing alloys tend to be required to have further improved fatigue and wear resistance. A solution of such a requirement has been to strengthen the aluminum bearing alloys by adding alloying elements of Cu, Zn, Mg, Si and so on. With such strengthening of the aluminum bearing alloys, the intermediate layer has been also tried to have improved fatigue resistance by adding strengthening elements including Mn.

The aluminum bearing alloy with strengthening additive elements of Cu, Zn, Mg, Si and so on is so produced that an aluminum bearing alloy layer is bonded to a steel back via an intermediate aluminum alloy layer by rolling and subsequently the layered structure is subjected to a solid solution-treatment of heating to a temperature of not lower than 400° C. followed by rapid cooling. However, when it is heated to the solid solution treatment temperature of not lower than 400° C., an inter-metallic compound of Al—Fe is generated at the interface between the steel back and the intermediate aluminum alloy layer. Since the inter-metallic compound of Al—Fe is quite brittle, there is a risk that the intermediate aluminum alloy layer might be delaminated from the steel back under operating conditions in which engine bearings are subjected to a varying load.

According to JP-A-61-272358, in order to avoid occurrence of brittle inter-metallic compounds at an interface between a steel back and an intermediate layer, heating to a solid solution treatment temperature is performed at a higher heating rate and the aimed temperature is kept for fully short time so as not to rise therefrom once after attaining the temperature. However, such a process is not practical because it requires a strict temperature control.

On the other hand, it is necessary to perform the solid solution treatment at a temperature as high as possible in order to improve the strength of the aluminum bearing alloys. For this, an intermediate aluminum alloy layer is desired.

BRIEF SUMMARY OF THE INVENTION

Accordingly, an object of the present invention is to prevent occurrence of brittle inter-metallic compounds at the interface between the steel back and the intermediate aluminum alloy layer whereby realizing a high temperature in a solid solution treatment and to improve aluminum bearing alloy in strength so that a multi-layered plain bearing having excellent fatigue resistance and a producing method thereof are provided.

According to one aspect of the present invention, there is provided a multi-layered plain bearing which comprises a steel back, an intermediate layer made of an aluminum alloy and an aluminum-base bearing alloy layer comprising one or more elements selected from the group consisting of Cu, Zn, Mg and Si, the aluminum-base bearing alloy layer being bonded to the steel back via the intermediate layer and subsequently subjected to a solid solution treatment at a temperature of not lower than 400° C., wherein the adjacent region of the intermediate layer to the steel back consists of, by mass, 2% to 8% of Si, and the balance of Al and incidental impurities.

When producing the multi-layered plain bearing, the layered material is heated to a temperature of not lower than 400° C. in the solid solution treatment, the element(s) of Cu, Zn, Mg and/or Si dissolves in the aluminum matrix so that the aluminum-base bearing alloy is hardened and strengthened by rapid cooling after the above heating whereby improving the multi-layered plain bearing in fatigue resistance. During the solid solution treatment, while an Al—Fe—Si inter-metallic compound precipitates preferentially rather than the Al—Fe inter-metallic compound at the adjacent side of the aluminum alloy intermediate layer to the steel back, the Al—Fe—Si inter-metallic compound does not precipitate at a temperature only above 400° C. until above 550° C. Thus, it is possible to effectively prevent occurrence of the brittle Al—Fe inter-metallic compound to perform the solid solution treatment.

According to another aspect of the present invention, there is provided a multi-layered plain bearing which comprises a steel back, an intermediate layer made of an aluminum alloy and an aluminum-base bearing alloy layer comprising one or more elements selected from the group consisting of Cu, Zn, Mg and Si, the aluminum-base bearing alloy layer being bonded to the steel back via the intermediate layer and subsequently subjected to a solid solution treatment at a temperature of not lower than 400° C. The intermediate layer comprises a sub-layer adjacent to the steel back, and at least one sub-layer other than the sub-layer adjacent to the steel back, wherein the sub-layer adjacent to the steel back consists of, by mass, 2% to 8% of Si, and the balance of Al and incidental impurities, and the at least one sub-layer other than the sub-layer adjacent to the steel back consists of, by mass, at least one element selected from the group consisting of from more than 0% to not more than 2% of Mn, from more than 0% to not more than 2% of Cu, from more than 0% to not more than 2% of Mg, from more than 0% to not more than 2% of Fe, and the balance of Al and incidental impurities.

Also in this case, as described in the first case under the first aspect, when the multi-layered plain bearing is heated to a temperature of not lower than 400° C. during a solid solution treatment, it is possible to effectively prevent occurrence of the brittle Al—Fe inter-metallic compound to increase the bonding strength between the intermediate layer and the steel back. During the solid solution treatment, in the at least one sub-layer other than the sub-layer adjacent to the steel back (i.e. at least one sub-layer of the intermediate layer existing at the side of aluminum-base bearing alloy layer), the element(s) of Cu, Zn, Mg and/or Si dissolves in the aluminum matrix so that the aluminum-base bearing alloy is hardened and strengthened by rapid cooling after the above heating whereby improving the multi-layered plain bearing in fatigue resistance.

The intermediate layer can have two functions or advantages which are an effect of preventing occurrence of the Al—Fe inter-metallic compound during the solid solution treatment and a strengthening effect by composing it with the plurality of sub-layers while strengthening the aluminum-base bearing alloy layer by the solid solution treatment, whereby it is possible to provide the multi-layered plain bearing with excellent fatigue resistance.

Here, grounds of the criticality will be described with regard to the additive alloying elements in the intermediate aluminum alloy layer.

(1) Si (2 to 8 mass %)

Si dissolves in the aluminum matrix and crystallizes as highly hard Si particles to increase the alloy hardness. When the multi-layered material is heated to a temperature of not lower than 400° C. in the solid solution treatment, the Al—Fe inter-metallic compound is not precipitated in the intermediate layer due to presence of Si. If the Si amount is less than 2 mass %, the above effects can not be attained. If the Si amount exceeds 8 mass %, plastic workability such as ductility is markedly deteriorated. Preferably the Si amount is 6 to 8 mass %.

(2) Mn or Mg (from More than 0 to not More than 2 mass %)

Mn or Mg dissolves in the aluminum matrix or crystallizes as an inter-metallic compound to increase the alloy strength. If its amount exceeds 2 mass %, the alloy becomes too hard thereby deteriorating the plastic workability of the alloy. Preferably the Mn or Mg amount is 0.7 to 1.5 mass %.

(3) Cu (from More Than 0% to Not More Than 2 mass %)

Cu dissolves in the aluminum matrix to increase the alloy strength including fatigue strength. If the Cu amount exceeds 2 mass %, the alloy becomes too hard thereby deteriorating the plastic workability of the alloy. Preferably the Cu amount is 0.7 to 1.7 mass %.

(4) Fe (from More than 0% to not More than 2 mass %)

Fe dissolves in the aluminum matrix or crystallizes to disperse as an inter-metallic compound thereby remarkably increasing the alloy strength. If the Fe amount exceeds 2 mass %, crystallizing iron inter-metallic compounds increase to markedly deteriorate plastic workability of the alloy. Preferably the Fe amount is 0.07 to 1 mass %.

The aluminum-base bearing alloy preferably comprises one or more elements selected from the following element groups (1) to (5).

(1) 3 to 20 mass % of Sn

Sn improves the surface performance of the bearing, which includes anti-seizure property, conformability and embeddability. If the Sn amount is less than 3 mass %, such an improvement effect can not be attained. If the Sn amount exceeds 20 mass %, the aluminum-base bearing alloy is deteriorated in mechanical property to become undurable under severe conditions such as in high power engines. Preferably, the Sn amount is 6 to 15 mass %.

(2) At Least One Element Selected from the Group Consisting of Cu, Zn, Mg and Si in an Amount or a Total Amount of 0.1 to 7 mass %.

These optional elements improve the strength of the aluminum matrix and can be forcedly dissolved by subjecting the aluminum-base bearing alloy to the solid solution treatment. It is also possible to precipitate fine inter-metallic compounds from the matrix by rapid cooling in the solid solution treatment. Si dissolves in the aluminum matrix. Crystallized elemental silicon is microscopically dispersed in the alloy to improve the alloy in fatigue strength and contribute to improvements of anti-seizure property and wear resistance. If the amount(s) of one or more of the elements is less than 0.1 mass %, such effects or advantages can not be attained. If the amount(s) of one or more of the elements exceeds 7 mass %, the precipitated inter-metallic compounds become coarse. The amount(s) of one or more of the elements is preferably of 0.5 to 6 mass % in total.

(3) At Least One Element Selected from the Group Consisting of Mn, V, Mo, Cr, Co, Fe, Ni and W in an Amount or a Total Amount of 0.01 to 3 mass %.

These optional elements dissolves in the aluminum matrix or crystallizes elementally or as inter-metallic compounds to improve the strength of the alloy. If the amount(s) of one or more of the elements is less than 0.01 mass %, such an effect is not expectable. If the amount(s) of one or more of the elements exceeds 3 mass %, the inter-metallic compounds become too coarse whereby deteriorating physical properties of the bearing alloy and plastic workability such as when rolling. The amount(s) of one or more of the elements is preferably 0.2 to 2 mass % in total.

(4) At Least One Element Selected from the Group Consisting of B (boron), Ti and Zr in an Amount or a Total Amount of 0.01 to 2 mass %.

These optional elements dissolve in the aluminum matrix to improve the fatigue strength of the bearing alloy. If the amount(s) of one or more of the elements is less than 0.01 mass %, such an effect is not expectable. If the amount(s) of one or more of the elements exceeds 2 mass %, the inter-metallic compounds become brittle. The amount(s) of one or more of the elements is preferably 0.02 to 0.5 mass % in total.

(5) At Least One Element Selected from the Group Consisting of Pb, Bi and In in an Amount or a Total Amount of not More than 3 mass %.

These additive elements improve machinability and anti-seizure property of the bearing alloy. If the amount(s) of one or more of the elements exceeds 3 mass %, it becomes difficult to uniformly distribute the element(s) in the aluminum matrix and the bearing alloy is deteriorated in strength.

The multi-layered plain bearing of the invention is produced by the process comprising the following steps:

bonding the intermediate layer of aluminum alloy to the aluminum-base bearing alloy layer;

bonding the aluminum-base bearing alloy layer to the steel back via the intermediate layer of aluminum alloy; and subjecting the thus obtained multi-layered material to a solid solution treatment of heating to a temperature of not lower than 400° C. followed by a rapid cooling to strengthen the aluminum-base bearing alloy layer.

BRIEF DESCRIPTION OF PREFERRED EMBODIMENTS OF THE PRESENT INVENTION

Herein below, referring to FIG. 1, there will be described one embodiment of the invention.

Figure 1:
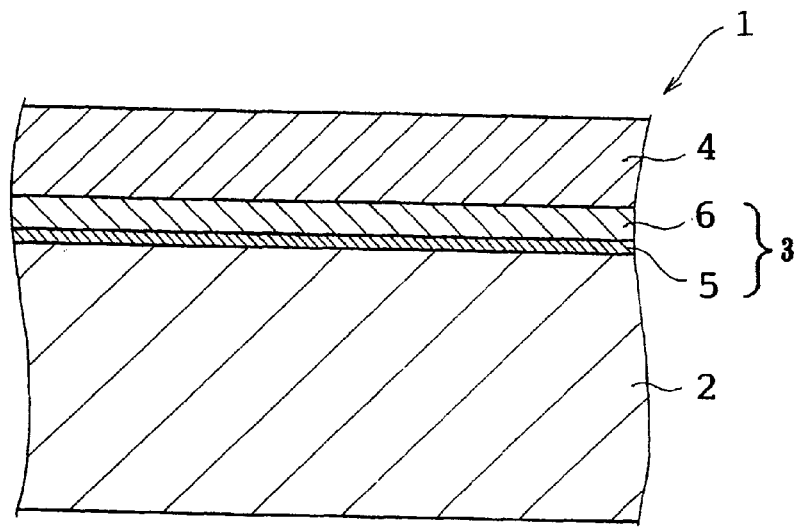
FIG. 1 is a sectional view of one embodiment of the multi-layered plain bearing of the invention.

A sectional view of multi-layered plain bearing 1 is shown in FIG. 1. The multi-layered plain bearing 1 is so structured that an aluminum-base bearing alloy layer 4 is bonded to a steel back 2 via an intermediate aluminum alloy layer 3. The intermediate aluminum alloy layer 3 consists of two layers which are a lower layer 5 existing at the side of the steel back 2 and an upper layer 6 at the side of the aluminum-base bearing alloy layer 4.

The aluminum-base bearing alloy layer 4 comprises, by mass, (1) 3% to 20% of Sn, and/or
(2) at least one element selected from the group consisting of Cu, Zn, Mg and Si in an amount or a total amount of 0.1% to 7%, and/or
(3) at least one element selected from the group consisting of Mn, V, Mo, Cr, Co, Fe, Ni and W in an amount or a total amount of 0.01% to 3%, and/or
(4) at least one element selected from the group consisting of B (boron), Ti and Zr in an amount or a total amount of 0.01% to 2%, and/or
(5) at least one element selected from the group consisting of Pb, Bi and In in an amount or a total amount of not more than 3%.

In the two sub-layers 5 and 6 of the intermediate aluminum alloy layer 3, the lower layer 5 consists of 2 to 8 mass % of Si and the balance of Al and incidental impurities, and the upper layer 6 consists of, by mass, at least one element selected from the group consisting of from more than 0% to not more than 2% of Mn, from more than 0% to not more than 2% of Cu, from more than 0% to not more than 2% of Mg, from more than 0% to not more than 2% of Fe, and the balance of Al and incidental impurities.

Now, there will be described a producing method of the multi-layered plain bearing 1 in FIG. 1.

A plate of aluminum-base bearing alloy, from which the aluminum-base bearing alloy layer 4 is made, is produced through usual casting and rolling.

An aluminum alloy plate, from which the lower layer 5 of the intermediate aluminum alloy layer 3 is made, is produced through usual casting and rolling. Another aluminum alloy plate, from which the upper layer 6 of the intermediate aluminum alloy layer 3 is made, is also produced through usual casting and rolling. The two aluminum alloy plates are bonded by rolling to produce the laminated aluminum alloy plate for the intermediate layer.

The aluminum-base bearing alloy plate and the laminated aluminum alloy plate are bonded by rolling to produce a multi-layered aluminum alloy plate.

The multi-layered aluminum alloy plate is superimposed on a low carbon steel strip to be a steel back and they are bonded with each other by rolling to produce a bimetal in which the aluminum-base bearing alloy plate is bonded to the low carbon steel strip via the laminated aluminum alloy plate for the intermediate layer.

Herein below, the aluminum-base bearing alloy plate, the laminated aluminum alloy plate for the intermediate layer and the low carbon steel strip are called as the aluminum-base bearing alloy layer 4, the intermediate aluminum alloy layer 3 and the steel back 2, respectively.

After the bimetal has been produced as described above, it is annealed at about 350° C. of temperature for 3 hours and subsequently subjected to the solid solution treatment at a temperature of 460° C. to 520° C. for 10 to 30 minutes whereby, in the aluminum-base bearing alloy layer 4, Cu, Zn, Mg and/or Si is dissolved in the aluminum matrix. In the temperature range of the solid solution treatment, the Al—Fe intermetallic compound is prevented to occur in the lower layer 5 of the intermediate aluminum alloy layer 3 by virtue of the Si effect as mentioned above.

The bimetal is cooled rapidly after heating in the solid solution treatment whereby the aluminum-base bearing alloy layer 4 is strengthened. Subsequently, the bimetal is formed to have a hemi-circular shape or a cylindrical shape so that the multi-layered plain bearing is produced. The bimetal may be optionally subjected to the artificial aging treatment, for example at a temperature of 150° C. to 200° C. for 20 hours, after the solid solution treatment of heating and rapid cooling.

According to the above embodiment, it is possible to prevent occurrence of the brittle Al—Fe inter-metallic compound in the lower layer 5 at the interface between the steel back 2 and the intermediate aluminum alloy layer 3 during the solid solution treatment. Thus, since there is no risk that the intermediate aluminum alloy layer 3 is delaminated from the steel back 2, the multi-layered plain bearing of the invention can be durably used in high power engines.

Figure 2:
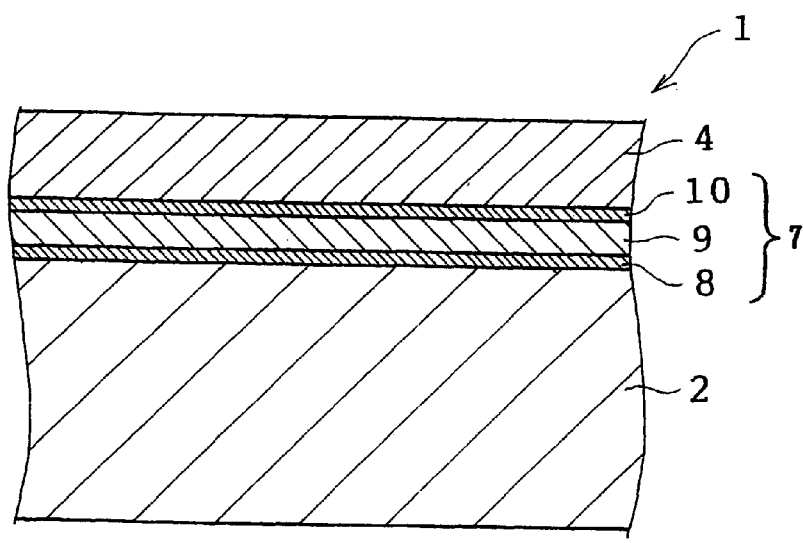
FIG. 2 is a similar drawing to FIG. 1, which shows another embodiment of the multi-layered plain bearing of the invention.

FIG. 2 shows an alternative to the first embodiment of FIG. 1, which is distinguished from the first embodiment in the point that an intermediate aluminum alloy layer 7 which has a three-layered structure consisting of a lower layer 8 which is adjacent to the steel back 2, a center later 9 which is bonded to the lower layer 8 and exists at the side of the aluminum-base bearing alloy layer 4 than the lower layer 8, and an upper layer 10 which is bonded to the center layer 9.

The upper and lower layers 8, 10 consist of an aluminum alloy having the same chemical composition as that of the lower layer 5 of the first embodiment, and the center layer 9 consists of another aluminum alloy having the same chemical composition as that of the upper layer 6 of the first embodiment.

Next, experimental results will be described.

Table 1 shows a result of experiment which was carried out in order to examine whether a brittle Al—Fe intermetallic compound is generated at the interface between the intermediate layer and the steel back with regard to invention specimen Nos. 1 to 7 and comparative specimen Nos. 11 to 13 when specimen multi-layered plain bearings are heated to various temperatures of the solid solution treatment. Respective specimen Nos. 1 and 11–13 comprises the intermediate layer, having a single-layer structure, and the aluminum-base bearing alloy layer both of which chemical compositions are shown in Table 2. Respective specimen Nos. 3, 4, 6 and 7 comprises the intermediate layer, having a double-layer structure, and the aluminum-base bearing alloy layer both of which chemical compositions are shown in Table 2. Respective specimen Nos. 2 and 5 comprises the intermediate layer, having a triple-layer structure, and the aluminum-base bearing alloy layer both of which chemical compositions are shown in Table 2.

TABLE 1

| | Specimen No. | Bearing structure | | | Bearing alloy layer | Solution treatment ° C. | Intermetallic compound x existence ○ nothing |
| --- | --- | --- | --- | --- | --- | --- | --- |
| | | Intermediate layer | | | | | |
| | | Lower layer | Center layer | Upper layer | | | |
| Invention Specimen | 1 | A | — | — | H | 500 | ○ |
| | 2 | A | C | A | G | 480 | ○ |

TABLE 1-continued

|  | Specimen No. | Bearing structure | | | Bearing alloy layer | Solution treatment °C. | Inter-metallic compound x existence ○ nothing |
|---|---|---|---|---|---|---|---|
|  |  | Intermediate layer | | | | | |
|  |  | Lower layer | Center layer | Upper layer | | | |
|  | 3 | A | — | D | H | 470 | ○ |
|  | 4 | A | — | E | I | 460 | ○ |
|  | 5 | B | C | B | J | 460 | ○ |
|  | 6 | B | — | E | K | 460 | ○ |
|  | 7 | B | — | F | L | 520 | ○ |
| Comparative Specimen | 11 | C | — | — | G | 420 | x |
|  | 12 | D | — | — | H | 400 | x |
|  | 13 | E | — | — | I | 400 | x |

TABLE 2

(Chemical composition (mass %))

| Intermediate layer | Si | Mn | Cu | Mg | Fe |
|---|---|---|---|---|---|
| A | 7.5 | — | — | — | — |
| B | 4.5 | — | — | — | — |
| C | — | 1.3 | — | — | — |
| D | — | — | 1.5 | — | — |
| E | — | — | — | 1.5 | — |
| F | — | — | — | — | 1 |

| Bearing alloy layer | Sn | Si | Cu | Mg | Zn | Fe | Mn | V | Mo | Cr | Ti |
|---|---|---|---|---|---|---|---|---|---|---|---|
| G | 20 | 2.5 | 1 | — | — | 0.4 | — | — | — | — | — |
| H | 13 | 3 | 1.4 | — | — | — | 0.3 | 0.2 | — | — | — |
| I | 10 | 3 | 1.5 | — | — | 0.3 | — | — | 0.3 | — | 0.15 |
| J | 10 | 1.5 | 1.4 | 0.1 | — | 1 | — | — | — | 0.3 | 0.1 |
| K | 3 | 4 | 2 | — | — | — | 0.3 | 0.1 | — | 0.2 | 0.2 |
| L | 3 | 2 | 0.8 | 0.5 | 3 | 0.1 | — | — | — | — | — |

As can be understood from Table 1, in the invention specimens, there could not be observed any Al—Fe compound even they were heated to a high temperature of 520° C., namely, they exhibit a high prevention effect upon occurrence of the Al—Fe compound. Thus, in the case where the temperature of solid solution treatment is set at 480° C., for example, even if an actual treatment temperature exceeded 480° C., there is no risk that the Al—Fe compound is generated, so that it is not required to so strictly control the temperature when conducting the solid solution treatment according to the invention.

Following Table 3 shows results of the tensile test on the bearing alloy layer and the fatigue test on the plain bearings with respect to the invention and comparative specimens shown in Table 1.

Table 4 shows requirements of the fatigue test.

TABLE 3

|  | Specimen No. | Tensile strength Mpa | Specific load without fatigue Mpa |
|---|---|---|---|
| Invention specimen | 1 | 180 | 130 |
|  | 2 | 180 | 130 |
|  | 3 | 180 | 130 |
|  | 4 | 185 | 130 |

TABLE 3-continued

|  | Specimen No. | Tensile strength Mpa | Specific load without fatigue Mpa |
|---|---|---|---|
|  | 5 | 180 | 130 |
|  | 6 | 190 | 135 |
|  | 7 | 185 | 135 |
| Comparative specimen | 11 | 160 | 110 |
|  | 12 | 155 | 110 |
|  | 13 | 155 | 100 |

TABLE 4

Fatigue test conditions

| Test machine | Fatigue test machine |
|---|---|
| Revolution | 3256 rpm |
| Peripheral speed | 9.0 m/s |
| Test time | 20 Hrs |
| Oil inlet temperature | 100° C. |
| Oil supply pressure | 0.49 Mpa |
| Lubricant | VG68 |
| Shaft material | JIS S55C |
| Evaluation | Maximum Specific load |

TABLE 4-continued

Fatigue test conditions

| Test machine | Fatigue test machine |
|---|---|
| | without fatigue |

As can be understood from Table 3, the invention specimens exhibit high specific loads without fatigue and excellent fatigue resistance. These are because the invention specimens were subjected to the solid solution treatment at high temperature so that the bearing alloy layers thereof are strengthened.

As will be apparent from the above, according to the invention, there is provided the multi-layered plain bearing in which good bonding strength between the aluminum-base bearing alloy layer and the steel back is ensured and the aluminum-base bearing alloy is strengthened so that the bearing has excellent fatigue resistance.

What is claimed is:

1. A multi-layered plain bearing which comprises a steel-back, an intermediate layer made of an aluminum alloy and an aluminum-base bearing alloy layer comprising one or more elements selected from the group consisting of Cu, Zn, Mg and Si, the aluminum-base bearing alloy layer being bonded to the steel back via the intermediate layer and subsequently subjected to a solid solution treatment at a temperature of not lower than 400° C., wherein the adjacent region of the intermediate layer to the steel back consists of, by mass, 2% to 8% of Si, and the balance of Al and incidental impurities.

2. A multi-layered plain bearing which comprises a steel back, an intermediate layer made of an aluminum alloy and an aluminum-base bearing alloy layer comprising one or more elements selected from the group consisting of Cu, Zn, Mg and Si, the aluminum-base bearing alloy layer being bonded to the steel back via the intermediate layer and subsequently subjected to a solid solution treatment at a temperature of not lower than 400° C., wherein:
    the intermediate layer comprises a sub-layer adjacent to the steel back, and at least one sub-layer other than the sub-layer adjacent to the steel back, wherein
    the sub-layer adjacent to the steel back consists of, by mass, 2% to 8% of Si, and the balance of Al and incidental impurities, and
    the at least one sub-layer other than the sub-layer adjacent to the steel back consists of, by mass, at least one element selected from the group consisting of from more than 0% to not more than 2% of Mn, from more than 0% to not more than 2% of Cu, from more than 0% to not more than 2% of Mg, from more than 0% to not more than 2% of Fe, and the balance of Al and incidental impurities.

3. A multi-layered plain bearing according to claim 1, wherein:
    the aluminum-base bearing alloy comprises, by mass,
    (1) 3% to 20% of Sn, and/or
    (2) at least one element selected from the group consisting of Cu, Zn, Mg and Si in an amount or a total amount of 0.1% to 7%, and/or
    (3) at least one element selected from the group consisting of Mn, V, Mo, Cr, Co, Fe, Ni and W in an amount or a total amount of 0.01% to 3%, and/or
    (4) at least one element selected from the group consisting of B (boron), Ti and Zr in an amount or a total amount of 0.01% to 2%, and/or
    (5) at least one element selected from the group consisting of Pb, Bi and In in an amount or a total amount of not more than 3%.

4. A multi-layered plain bearing according to claim 2, wherein:
    the aluminum-base bearing alloy comprises, by mass,
    (1) 3% to 20% of Sn, and/or
    (2) at least one element selected from the group consisting of Cu, Zn, Mg and Si in an amount or a total amount of 0.1% to 7%, and/or
    (3) at least one element selected from the group consisting of Mn, V, Mo, Cr, Co, Fe, Ni and W in an amount or a total amount of 0.01% to 3%, and/or
    (4) at least one element selected from the group consisting of B (boron), Ti and Zr in an amount or a total amount of 0.01% to 2%, and/or
    (5) at least one element selected from the group consisting of Pb, Bi and In in an amount or a total amount of not more than 3%.

5. A method of producing the multi-layered plain bearing defined in claim 1, which comprises the following steps:
    bonding the intermediate layer of aluminum alloy to the aluminum-base bearing alloy layer;
    bonding the aluminum-base bearing alloy layer to the steel back via the intermediate layer of aluminum alloy; and
    subjecting the thus obtained multi-layered material to a solid solution treatment of heating to a temperature of not lower than 400° C. followed by a rapid cooling to strengthen the aluminum-base bearing alloy layer.

6. A method of producing the multi-layered plain bearing defined in claim 2, which comprises the following steps:
    bonding the intermediate layer of aluminum alloy to the aluminum-base bearing alloy layer;
    bonding the aluminum-base bearing alloy layer to the steel back via the intermediate layer of aluminum alloy; and
    subjecting the thus obtained multi-layered material to a solid solution treatment of heating to a temperature of not lower than 400° C. followed by a rapid cooling to strengthen the aluminum-base bearing alloy layer.

7. A method of producing the multi-layered plain bearing defined in claim 3, which comprises the following steps:
    bonding the intermediate layer of aluminum alloy to the aluminum-base bearing alloy layer;
    bonding the aluminum-base bearing alloy layer to the steel back via the intermediate layer of aluminum alloy; and
    subjecting the thus obtained multi-layered material to a solid solution treatment of heating to a temperature of not lower than 400° C. followed by a rapid cooling to strengthen the aluminum-base bearing alloy layer.

8. A method of producing the multi-layered plain bearing defined in claim 4, which comprises the following steps:
    bonding the intermediate layer of aluminum alloy to the aluminum-base bearing alloy layer;
    bonding the aluminum-base bearing alloy layer to the steel back via the intermediate layer of aluminum alloy; and
    subjecting the thus obtained multi-layered material to a solid solution treatment of heating to a temperature of not lower than 400° C. followed by a rapid cooling to strengthen the aluminum-base bearing alloy layer.

* * * * *